Patented Mar. 12, 1940

2,192,953

UNITED STATES PATENT OFFICE 2,192,953

COATING COMPOSITION

Clifford K. Sloan and Gordon D. Patterson, Wilmington, Del., assignors to E. I. du Pont de Nemours & Company, Wilmington, Del., a corporation of Delaware No Drawing. Application July 22, 1936,
Serial No. 91,966

17 Claims. (Cl. 134—39)

This invention relates to coating compositions, and especially to the improvement of the properties of pigmented systems, particularly the properties affecting the flow and working properties thereof.

It is well known that pigmented systems often possess unsatisfactory working properties, as an example of which the undesirable property of absence of flow of a Lithol Red printing ink is mentioned. Heretofore attempts to induce flow in such a system have been unsuccessful. Other pigments that often possess poor flowing properties when ground in coating compositions include chrome yellows, carbon blacks and phosphotungstic acid toners. Coating compositions containing chrome yellows or certain other pigments such as alumina hydrate, lakes, and maroons also have the undesirable property of thickening or livering upon storage, thus becoming unfit for use.

This invention has as an object the bringing about of a marked improvement in the flow and working properties of pigmented coating compositions. Another object is to improve the stability of pigmented coating compositions. These and other objects will appear hereinafter in connection with the description of the invention.

The objects of the invention are attained generally by incorporating in the pigmented system or coating composition at least one of the class of polyhydroxy amines represented by the following general formula:

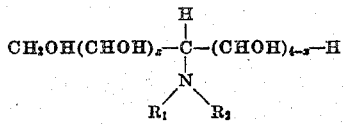

in which x is 3 or 4, and $R_1$ and $R_2$ are like or unlike hydrocarbon radicals selected from the class of alkyl and aryl groups or hydrogen. These amines may be made conveniently from reducing sugars containing at least five carbon atoms, such as glucose, fructose, galactose, lactose, mannose and the like. Thus, glucamine and methyl glucamine may be readily prepared by reacting glucose, ammonia or methyl amine, and hydrogen at elevated temperatures and pressures in the presence of a suitable hydrogenating catalyst. The reaction for the preparation of methyl glucamine may be represented by the following equation:

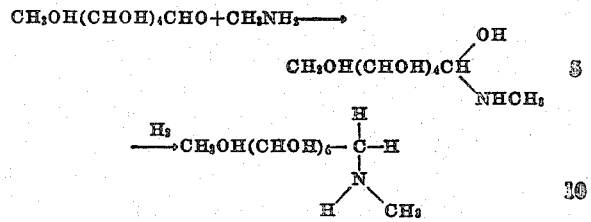

Reference is also made to Patents No. 2,016,962 and No. 2,016,963 to Robert E. Flint and Paul L. Salzberg which describe this class of amines and processes for their preparation.

Among the sugars which may be employed to produce the amines are glucose, fructose, xylose, ribose, lyxose, lactose, arabinose, mannose, rhamnose, galactose, sorbose, sorbinose, gulose, talose and others.

By a pigmented coating composition we mean a coating composition containing essentially a binder, such as an oil or resin composition having drying or hardening properties, and a color or pigment constituent. By a pigmented system we mean a composition containing a pigment and one or more constituents useful in preparation of such a coating composition. It is evident that the coating composition may contain other substances for variously modifying the properties of the same.

In accordance with our invention relatively small amounts of the above type of polyhydroxy amines are incorporated in coating compositions, especially in pigmented coating compositions. It can be practiced by addition of the polyhydroxy amine to the pigment, to the vehicle, or to the pigmented composition, before, during, or after grinding. The amount of polyhydroxy amine to be used in a particular system is largely dependent on the oil absorption of the pigment. For example, pigments of high oil absorption such as Lithol Red, phosphotungstic acid toners, and carbon black generally require greater amounts of the polyhydroxy amine per unit weight of pigment than do pigments such as chrome yellows, lithopone, and zinc oxide.

The following examples will serve to illustrate how our invention is operated, it being understood that the invention is not restricted thereby.

Example I

In the preparation of a red printing ink, 4 parts by weight of glucamine are added to a mixture consisting of 50 parts of Lithol Red toner and 75 parts of lithographic varnish (Carter's No. 3 Regular). The mixture is then milled by passing it through a three roll ink mill four times. The resulting printing ink has superior flowing properties and it feeds onto the printing roll more satisfactorily than does the printing ink in which no glucamine has been incorporated. Carter's No. 3 Regular is a bodied linseed oil used in the manufacture of printing inks.

Example II

A phosphotungstic acid toner of improved properties for use in printing inks is prepared by blending 100 pounds of the toner prepared from Victoria Pure Blue BO with 5 pounds of methyl glucamine. The resulting pigment has improved properties as compared with the unblended pigment. Printing inks prepared from the improved pigment have the desirable property of flow which is absent in the ordinary product which is prepared without incorporating methyl glucamine.

Example III

A chrome yellow pigment highly resistant to livering is prepared by blending one part by weight of methyl glucamine with one hundred parts of chrome yellow. This is advantageously done by giving a dried press cake of chrome yellow a preliminary pass through a pulverizer after which it is sprayed with a 70 per cent solution of methyl glucamine in water, using enough of this solution to give a final methyl glucamine content of one per cent on the pigment. Most of the added moisture is removed during subsequent pulverization of the treated pigment. The resultant product is highly resistant to livering when ground into coating composition systems. When ground with one third of its weight of lithographic varnish, a printing ink is obtained which remains in good condition for at least a year's can storage, whereas a similar grind of the untreated chrome yellow has poor flowing properties in that it livers up badly within a few days.

Example IV

Using a polyhydroxy amine, it is possible to make use of reactive white pigments in systems that otherwise thicken badly on storage. Addition of 0.685 part of glucamine to a grind of the following composition results in a white enamel of satisfactory flowing properties as indicated by its can stability.

| | Parts |
|---|---|
| Lithopone (Ponolith HO) | 68.5 |
| Bodied linseed oil (V-2882) (bodied by heating at about 575° F. without drier) | 15.8 |
| Mineral spirits | 15.7 |

Example V

A carbon black pigment is treated with 10 per cent of its weight of methyl glucamine, the operation consisting of tumbling the two powders together. The resulting pigment grinds out in oils and resins to give a product of better color and improved flowing properties. The treated pigment is especially suitable for preparation of high grade black lithographic inks.

Example VI

A red enamel of superior gloss and flow as characterized by freedom from brush marks is prepared in the following manner. Grind 90 parts of Lithol Red containing 4 per cent by weight of glucamine with 210 parts of a 45 gallon limed rosin-linseed oil varnish, giving the material three passes through a buhrstone mill. Reduce the milled base to an enamel having a pigment binder ratio of 20/100 by mixing 40 parts of the base with 80 parts of the same varnish as used in the grind. Reduce with thinner to brushing consistency. Brush-outs of the material show a marked improvement in flow as indicated by improved gloss and freedom from brush marks as compared with that of a similar material prepared without glucamine. The beneficial effect of the agent is also apparent in the mill base which has a marked fluidity as compared with the ordinary red enamel mill base. The beneficial effect of the glucamine is also evidenced by the greater ease with which the mill base is reduced with the added vehicle.

Example VII

A metal protective paint containing an oil modified polyhydric alcohol-polycarboxylic acid resin and basic lead chromate of superior properties is prepared by grinding the following composition in a ball mill:

| | Parts |
|---|---|
| Basic lead chromate | 178 |
| 35% leaded zinc oxide | 45 |
| Magnesium silicate | 74 |
| Glucamine | 3 |
| Modified 52% linseed oil alkyd resin | 120 |
| Petroleum thinner | 62 |
| Drier solution (lead and manganese) | 8 |

When thinned to brushing consistency the resulting paint is stable on storage whereas a similar paint containing no glucamine tends to "break" quickly with thickening of the free vehicle.

Example VIII

A red enamel of improved flow, as made evident by improved gloss, is prepared by combination of the following ingredients:

| | |
|---|---|
| Methyl glucamine | 0.37 |
| Toluidine toner | 9.2 |
| "Amberol"-wood oil varnish (5 gal.) | 11.8 |
| "Amberol"-wood oil varnish (40 gal.) | 29.4 |
| Bakelite-wood oil varnish (10 gal.) | 20.2 |
| Cobalt drier solution (2% metal) | 0.7 |
| Manganese drier solution (3% metal) | 0.5 |
| Lead drier solution (16% metal) | 0.4 |
| Special petroleum fraction (145°-205° C.) | 5.4 |
| Hi-Flash naphtha substitute (135°-210° C.) | 22.03 |
| | 100.00 |

Amberol is an oil soluble resin containing phenol and formaldehyde, and it is usually modified, for example by rosin. "Bakelite" is an oil soluble phenol-formaldehyde resin.

The above ingredients are compounded by the usual methods of enamel formulation, the powdery character of the methyl glucamine permitting its addition to the pigment-vehicle mix prior to grinding. The resulting enamel has a high, enamellike gloss whereas a similar pigmented composition prepared without the methyl glucamine has a decidedly lower gloss, being "eggshell" in appearance.

The amounts of polyhydroxy amines recited in the above examples are not to be construed as limiting our invention. For example, in Example I, the amount of polyhydroxy amine may be reduced to 4 per cent of the pigment without seriously affecting the improvement obtained. On the other hand, the amount of the agent can be increased above the 8 per cent recited in the example, but more than 8 per cent is generally unnecessary. Those skilled in the art will appreciate that the amount used in the other systems recited as illustrations may likewise be changed. With chrome yellow, as little as 0.25 per cent of a polyhydroxy amine on the pigment will reduce the livering tendency remarkably.

The exact mode of adding the polyhydroxy amine to the components of the coating composition is immaterial, the invention includes all methods in which the free polyhydroxy amine can be added to the coating composition, such as the addition of the polyhydroxy amine to the pigment by methods apparent to those familiar with pigment manufacture, addition to a component of the vehicle (such as an oil, resin or other binder, thinner, or drier), or addition to the pigmented composition either before or during mixing, or addition before, during, or after grinding. The differences in methods of adding the various polyhydroxy amines will be evident to those skilled in the art as suggested by their experience in incorporating other ingredients and by the powdery, gummy or syrupy nature of the amine to be incorporated.

While in the above examples the intended purposes are attained only by the use of glucamine or methylglucamine, the objects of our invention are attained by the use of any free polyhydroxy amine having the general formula cited above. For example, similar effects are attained by incorporating methyl xylamine, butyl xylamine, methyl galactamine, methyl fructamine and other primary, secondary, or tertiary polyhydroxy amines belonging to the class as hereinbefore indicated.

Our invention is not limited to pigmented compositions containing only the pigments above mentioned. It has been found to be operative with many other pigments that tend to give troublesome thickening effects in coating compositions either early or late in the life of the system. The flow of other systems containing organic red pigments such as toluidines, paras, and the Lithol Red pigments, especially those which have been treated with alkaline earth rosinate according to Reissue Patent No. 18,590 may also be improved thereby. Proper control of the degree of dispersion in systems containing other pigments can be accomplished by this type of agent. These include lithopone, zinc oxide, titanium-containing pigments and chrome greens. Treating of the latter pigment system is of special importance because of the effect of dispersion control on pigment flooding. The other property of the polyhydroxy amines in reducing livering can be made use of with reactive pigments including alumina hydrate, lakes, zinc oxide, basic lead chromate, litharge, and red lead. In certain cases, as with chrome yellows, the action of the polyhydroxy amine is twofold: reducing false body of the pigmented composition and also preventing bodying up or livering on storage.

Whereas the only drying oil listed in the above examples is linseed oil, our invention is applicable to other drying oils such as China-wood oil. In like manner, the invention is applicable to other synthetic resins than the alkyd type and includes other materials such as Bakelite and nitrocellulose. Still another modification of our invention involves the treatment of resins and oils with polyhydroxy amines prior to incorporation with the pigment.

Our invention is of special value in connection with improving the flow of printing inks containing Lithol Red either with or without treatment with alkaline earth rosinate according to Reissue Patent No. 18,590 where all other attempts to overcome "puffiness" have failed. The improved flow is appreciated by the ink user because of better feeding characteristics on the printing rolls. Improved flow and reduction in livering tendency is especially important in printing inks where pigment concentration is higher than in ordinary paints and enamels. The improved flow also makes it possible to increase pigment concentration without sacrificing working properties. Improved flow and reduced livering tendency are also appreciated in ordinary paint and enamel systems, however. Among other improvements in such systems occasioned by use of polyhydroxy amines is the greater gloss and freedom from brush marks that results.

As many different embodiments of the invention will be apparent to those skilled in the art without departure from the spirit and scope of the described invention, it is to be understood that no limitations are intended in the annexed claims except such as are imposed by the prior art or are specifically recited.

We claim:

1. A pigmented coating composition which comprises a pigment, glucamine, and a binder selected from the class consisting of drying oils, synthetic resins, and organic cellulose derivatives.

2. A pigmented coating composition which comprises a pigment, methyl glucamine, and a binder selected from the class consisting of drying oils, synthetic resins, and organic cellulose derivatives.

3. A pigmented coating composition which comprises a pigment, an alkyl glucamine, and a binder selected from the class consisting of drying oils, synthetic resins, and organic cellulose derivatives.

4. A pigmented coating composition which comprises a pigment, a binder selected from the class consisting of drying oils, synthetic resins, and organic cellulose derivatives, and an aliphatic polyhydroxy amine represented by the general formula:

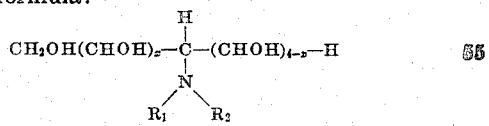

in which $x$ is 3, and $R_1$ is a hydrocarbon radical and $R_2$ is one of the group consisting of a hydrocarbon radical and hydrogen.

5. A pigmented coating composition which comprises a pigment, a binder selected from the class consisting of drying oils, synthetic resins, and organic cellulose derivatives and an aliphatic polyhydroxy amine represented by the general formula:

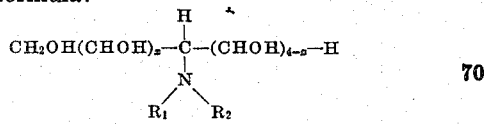

in which $x$ is 4, and $R_1$ is a hydrocarbon radical and $R_2$ is one of the group consisting of a hydrocarbon radical and hydrogen.

6. A pigmented coating composition which comprises a pigment, a binder selected from the class consisting of drying oils, synthetic resins, and organic cellulose derivatives, and an aliphatic polyhydroxy amine represented by the general formula:

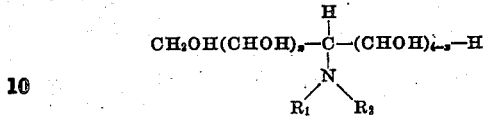

in which $x$ is at least 3 and not more than 4, and $R_1$ is a saturated open chain aliphatic radical and $R_2$ is one of the group consisting of hydrogen and a saturated open chain aliphatic radical.

7. A pigmented coating composition which comprises a pigment, a binder selected from the class consisting of drying oils, synthetic resins, and organic cellulose derivatives, and an aliphatic polyhydroxy amine represented by the general formula:

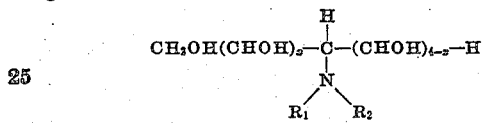

in which $x$ is at least 3 and not more than 4, and $R_1$ and $R_2$ represent saturated open chain aliphatic radicals.

8. A pigmented coating composition which comprises Lithol Red toner, glucamine, and a binder selected from the class consisting of drying oils, synthetic resins, and organic cellulose derivatives.

9. A pigmented composition comprising a pigment, and a polyhydroxy amine represented by the formula:

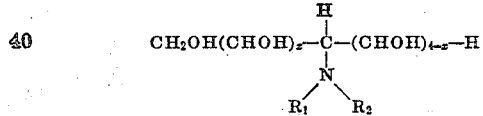

in which $x$ represents at least 3 and not more than 4, $R_1$ is a hydrocarbon radical and $R_2$ represents one of the group consisting of hydrocarbon radicals and hydrogen.

10. A pigmented composition comprising a pigment, and about 0.25% to about 8.0% by weight of a polyhydroxy amine represented by the formula:

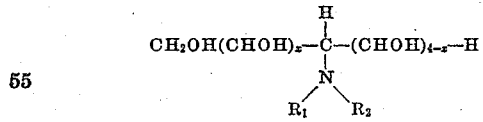

in which $x$ represents at least 3 and not more than 4, and $R_1$ and $R_2$ represent one of the group consisting of hydrocarbon radicals and hydrogen.

11. A pigmented composition comprising Lithol Red toner, and about 0.25% to about 8.0% by weight of a polyhydroxy amine represented by the formula:

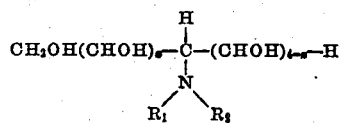

in which $x$ represents at least 3 and not more than 4, and $R_1$ and $R_2$ represent one of the group consisting of hydrocarbon radicals and hydrogen.

12. A pigmented composition comprising red lead, and a polyhydroxy amine represented by the formula:

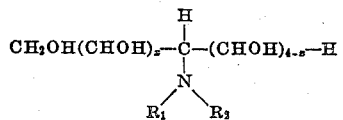

in which $x$ represents at least 3 and not more than 4, $R_1$ is a hydrocarbon radical and $R_2$ represents one of the group consisting of hydrocarbon radicals and hydrogen.

13. A pigmented composition comprising Lithol Red, and a polyhydroxy amine represented by the formula:

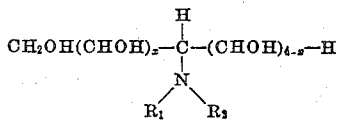

in which $x$ represents at least 3 and not more than 4, $R_1$ is a hydrocarbon radical and $R_2$ represents one of the group consisting of hydrocarbon radicals and hydrogen.

14. A pigmented composition comprising chrome yellow, and a polyhydroxy amine represented by the formula:

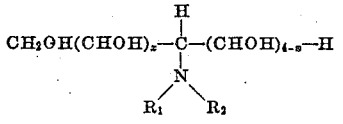

in which $x$ represents at least 3 and not more than 4, $R_1$ is a hydrocarbon radical and $R_2$ represents one of the group consisting of hydrocarbon radicals and hydrogen.

15. A pigmented composition comprising a pigment and a glucamine.

16. A pigmented composition comprising a pigment and methyl glucamine.

17. A pigmented composition comprising a pigment and methyl xylamine.

CLIFFORD K. SLOAN.
GORDON D. PATTERSON.